United States Patent Office 3,145,231
Patented Aug. 18, 1964

3,145,231
PROCESS FOR THE REDUCTION OF HALO NITRO AROMATIC COMPOUNDS
John Richard Kosak, Wilmington, Del., assignor to E. I. du Pont de Nemours and Company, Wilmington, Del., a corporation of Delaware
No Drawing. Filed Apr. 9, 1962, Ser. No. 185,800
12 Claims. (Cl. 260—580)

This invention is directed to a novel process for catalytically reducing halogen substituted aromatic nitro compounds to the corresponding halogen substituted amines. In particular, the present invention involves the use in such process of a platinum catalyst and a heterocyclic nitrogen base as more fully described hereinafter.

It is recognized in the art that the catalytic reduction of halogen substituted aromatic nitro compounds to the halogen substituted amine is not satisfactory because of extensive dehalogenation during the process. For example, Baltzley and Phillips state in the Journal of the American Chemical Society 68, 261 (1946): "The removal of the halogen during catalytic hydrogenations of organic compounds is a familiar phenomenon" and "despite occasional instances to the contrary, most workers have considered loss of halogen inevitable in catalytic hydrogenations."

U.S. Patent 2,791,613 recognizes that hydrogenation processes "are not generally suitable for converting halonitrobenzenes to haloanilines, primarily because considerable dehalogenation accompanies the reduction reaction"; the process of this patent alleviates the problem as far as meta-halonitrobenzene is concerned by using a complex catalyst of copper and chromium. Unfortunately, this complex catayst requires special conditions and is not generally applicable to other than meta-halogenated benzenes.

U.S. Patent 2,772,313 also recognizes that prior art processes "are not entirely suitable for hydrogen reduction of halonitrobenzenes to haloanilines" and teaches the use of a rhodium catalyst to effect reduction with a minimum of dehalogenation; this rhodium catalyst is extremely expensive, about four times the cost of a comparable platinum catalyst, and the process utilizing it requires the presence of an organic solvent.

British Patent 859,251 discloses the hydrogenation of halogen substituted aromatic nitro compounds to the corresponding amines in the presence of a platinum on carbon catalyst and magnesium oxide (or hydroxide) in controlled amounts to suppress dehalogenation.

It is an object of this invention to provide a novel process whereby catalytic hydrogenation of halogen substituted aromatic nitro compounds may be accomplished substantially without attendant dehalogenation.

It is a further object to effect this reduction with a relatively inexpensive but highly effective hydrogenation catalyst in combination with a novel dehalogenation suppressor, in either aqueous or solvent systems as preferred.

Another object is to provide such a process affording improved results in regard to suppressing the dehalogenation reaction. Still another object is to advance the art.

These and other objects will become apparent in the following description and claims.

More specifically, the present invention is directed to a process for minimizing the formation of dehalogenated products during the preparation of halogen substituted aromatic amines by the catalytic hydrogenation of nitro monocarbocyclic aromatic hydrocarbons bearing 1 to 2 halogens taken from the group consisting of Cl and Br, which process comprises effecting the reduction of said nitro compounds, at temperatures of from 30 to 150° C. and hydrogen gas pressures of at least about 100 p.s.i.g., in the presence of (a) a platinum hydrogenation catalyst, in amount providing one part of Pt for every 10,000 to 100,000 parts by weight of said nitro compound, and
(b) a cycloaliphatic nitrogen base having the following formula:

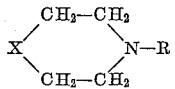

where X is a radical selected from the group consisting of oxygen and N—R, and R is selected from the group consisting of hydrogen, methyl, and ethyl radicals, the quantity of said nitrogen compound corresponding to 0.01 to 1.5 moles per mole of said nitro compound.

Preferably, the cycloaliphatic compound is defined by X=O and in particular by R=H; in other words morpholine and alkyl substituted morpholines constitute a preferred sub-class of cycloaliphatic nitrogen base which may be utilized in the practice of the present invention.

This invention is based on the discovery that the cycloaliphatic amines, as herein described, effectively suppress the dehalogenation side reaction that normally occurs to a large extent during the catalytic hydrogenation of halogen substituted aromatic nitro compounds. Morpholine is particularly effective and is highly preferred.

The process of this invention is conveniently conducted without difficulty in conventional equipment. It may be carried out batchwise or continuously and with or without solvents. In general, the reaction vessel is charged with the nitro body, the catalyst, and the cycloaliphatic nitrogen base. Then hydrogen gas is passed into the system under super-atmospheric pressure as the reactants are vigorously agitated and heated at the indicated temperatures. The reaction is judged complete when analysis for nitro body shows less than 0.2% unreduced material present. The reduction mass is filtered to recover the catalyst, the amine product is separated from the water of reaction and then dried. The amine product may be further purified by distillation if an extremely high quality product is desired.

The temperatures and pressures of hydrogenation may vary widely as herein described. Preferred operating temperatures are in the range 50 to 120° C.; temperatures below about 30° and higher than about 150° are considered impractical. In general, operating temperatures are chosen such that the reaction mass is fluid during the reduction and will vary with the particular nitro compound being hydrogenated, the amount of the cycloaliphatic nitrogen base present and the choice of solvent if one is used. Hydrogenation pressures of from about 200 to 600 p.s.i.g. are preferred. Satisfactory results are not always attained at pressures below about 100 p.s.i.g., while pressures above about 700 p.s.i.g. are normally unnecessary.

One significant and practical feature of this novel process is that a solvent is not ordinarily required, although if desired solvents may be used, such as water, lower alkanols (methanol, ethanol, propanol, butanol) and water-miscible ethers (tetrahydrofuran and dioxane).

The platinum catalyst may consist essentially of the metal itself or the metal may be disposed on an inert support such as a carbon black or diatomaceous earth. The free metal is conveniently employed in the form of platinum oxide, e.g. Adams catalyst, which under the conditions of the hydrogenation is reduced to the finely divided active metal. Preferably, the catalyst will consist essentially of platinum supported on carbon. Supported catalysts may be prepared by any of the methods known to the art such as (a) impregnating the support with a platinum metal salt solution by evaporating a solution of the platinum salt in the presence of the support or (b) precipitating platinum hydroxide in the presence of the support by adding a platinum chloride solution to a hot alkaline solution in which the support is suspended. A preferred procedure involves adding bicarbonate to a solution of platinum chloride in water containing suspended carbon, then heating to precipitate platinum hydroxide, and filtering off the catalyst, as exemplified in U.S. Patent 2,823,235 and British Patent 859,251. This catalyst containing platinum as the oxide or hydroxide may be used as such or it may first be reduced to metallic platinum, either by hydrogenation or by treatment with a chemical reducing agent such as formaldehyde.

The platinum component of the catalyst is believed critical. With other metals such as palladium and nickel excessive dehalogenation occurs. The carbon support for platinum may be any porous or non-porous amorphous material. Oleophilic carbons have the advantage of giving increased reduction rates as described in U.S. Patent 2,823,235. Such highly oleophilic carbons are known in the trade as Shawinigan Acetylene Black or conductive furnace blacks. However, other carbons may be used, for example, furnace blacks such as Spheron No. 6, Philblack O, Lampblack, or commercial activated carbons of vegetable or animal origin such as Norit, Darco G-60, etc.

Normally, the concentration of platinum metal on the support will be between 0.5% and 5%, preferably about 1% by weight. A concentrated catalyst with about 5 to 10% Pt may be prepared and subsequently diluted for use as described in U.S. Patent 2,823,235 and in British Patent 859,251. The ratio of nitro body to platinum is ordinarily maintained above 10,000:1 and below about 100,000:1. With too much platinum dehalogenation tends to occur to an objectionable extent. On the other hand, sufficient catalyst should be given to give practical rates of reduction. Preferred ratios are in the range 25,000 to 75,000:1.

The dehalogenation suppressor of this novel process may be one or more cycloaliphatic amines such as piperazine, morpholine, or N—$C_1$—$C_2$ alkyl derivative thereof. Included are such alkyl derivatives as N-methyl morpholine, N-ethyl morpholine, N-methyl piperazine, N-ethyl piperazine, N,N'-dimethyl piperazine.

These substances, while effective as a class for the stated purpose, are not equivalent. Morpholine is outstandingly effective to suppress dehalogenation during the hydrogenation of the halogen substituted nitro aromatic compounds.

The quantity of the cycloaliphatic amine component will vary depending primarily on the particular nitro body to be hydrogenated and the effect desired. In general, enough of this material is employed to suppress dehalogenation and prevent the development of acidity during the hydrogenation. At mole ratios of cycloaliphatic amine to nitro body of less than 0.01:1 dehalogenation is not always suppressed to the desired extent; at higher ratios than 1.5:1 product quality may be adversely affected. Preferred ratios range from about 0.02 to about 1:1, particularly those below about 0.2:1 for reasons of economy.

The novel process of this invention is applicable to the conversion of halogen substituted aromatic nitro compounds to the corresponding halogen substituted aromatic amines without substantial loss of halogen. It is particularly applicable to such conversion of the commercially important chloro- and bromo-substituted nitrobenzenes and nitroalkylbenzenes containing up to 10 carbon atoms and two halogens, exemplified by: p-nitrochlorobenzene; o-nitrochlorobenzene, m-nitrochlorobenzene; m-nitrobromobenzene; 2-chloro-4-nitrotoluene, 4-chloro-2-nitrotoluene; 3-chloro-4-nitroethylbenzene; 4-bromo-2-nitrotoluene; 2,4-dichloronitrobenzene; 3,4-dichloronitrobenzene; 3,5-dichloronitrobenzene; 4-chloro-6-nitro meta-xylene; 3-chloro-4-nitro-propylbenzene; and 3-chloro-4-nitrobutyl benzene.

Representative examples illustrating the present invention follow.

*Example 1*

A stainless steel autoclave equipped with a jacket for heating, coils for circulating cooling water, and an efficient agitator is charged with: 400 parts of 1-nitro-3,4-dichlorobenzene; 4 parts of morpholine; and 0.012 part of platinum as a catalyst paste consisting of platinum hydroxide deposited on Shawinigan Black, the quantity of platinum being 1% wt. of the wet (water) paste and 3% wt. on a dry basis. The quantity of morpholine employed corresponds to 0.023 mole per mole of nitro body, that of the catalyst to about 1 part of Pt for 33,000 parts of nitro body.

Air in the autoclave and lines is displaced by pressurizing with nitrogen and releasing the pressure through a vent system. The nitrogen is then displaced with hydrogen by successive pressurizings to 350 p.s.i.g. and venting to zero. The temperature of the mixture is then raised to 70° C., the agitator started, and the hydrogen pressure increased to 350 p.s.i.g. Absorption of hydrogen is rapid with evolution of heat; the temperature is held at 80±10° C. by circulating cold water through the cooling coils. The autoclave is repressured with hydrogen to 350 p.s.i.g. after each 100 lb. drop in pressure. When no further hydrogen absorption occurs, the mass is held 30 minutes longer at 80° C. and 350 p.s.i.g. pressure, for a total hydrogenation time of 3 to 4 hours.

The hot reduction mass is then filtered, the filtrate allowed to settle at 70 to 85° C., and the layers separated. The water layer is diluted to 100 parts and analyzed. It has a pH of 7.7 and contains 0.35% chloride ion, which represents 0.12 mole percent of dechlorination.

The dichloroaniline layer is dehydrated by heating at 100±10° C. at 20 mm. of Hg pressure to yield substantially pure dichloroaniline (99.7%), having a freezing point of 70.7° C. If desired, the dichloroaniline product can be distilled under reduced pressure in the presence of 2% wt. soda ash and 0.25% wt. tetraethyl pentamine, as described by Franklin and McCarthy in U.S. Patent 2,911,340, to obtain 3,4-dichloroaniline in better than 90% yield.

If the magnesium oxide is employed as the dehalogenation inhibitor in this system as described in British Patent 859,251, dehalogenation is suppressed to a considerable extent but it is still of the order of 0.83 mole percent dechlorination.

If the dehalogenation inhibitor is omitted, the proportion of dehalogenated amine in the product is so great as to make catalytic hydrogenation impractical for the preparation of the dichloroaniline.

*Example 2*

Example 1 is repeated except that 3,5-dichloronitrobenzene is used in place of the 3,4-dichloro isomer and the hydrogenation is run at 95±5° C. and 500 p.s.i.g. hydrogen pressure for one hour. 3,5-dichloroaniline is recovered in 95% yield as dehydrated product having a purity of 98.4% (by nitrate adsorption) and freezing at 47.8° C. By analysis of the water soluble products of the reaction, the extent of dehalogenation is about 0.2 mole percent.

*Example 3*

Following the procedure of Example 1, a mixture of 200 parts of p-nitrochlorobenzene, 20 parts of morpholine (0.18 mole per mole of nitro body), and 0.008 part of platinum (as catalyst paste described in Example 1) is hydrogenated at 75°±5° C. and 500 p.s.i.g. hydrogen pressure.

The p-chloroaniline layer, after being dehydrated at 90°±5° C. and 20 mm. of Hg pressure, amounts to 151.3 parts having an acid-insoluble content of 0.02% and a purity of 99.1%.

Based on the chloride content of the water layer of the reaction product the extent of dehalogenation is 0.3 mole percent. In comparison, when the morpholine is omitted the extent of dehalogenation is at least 2 mole percent based on the amount of aniline formed, and the reaction product is strongly acid, which condition can promote further dehalogenation.

When the above procedure is repeated with 115 parts of morpholine corresponding to 1.04 moles per mole of p-chloronitrobenzene, the extent of dehalogenation is less than 1 mole percent.

*Example 4*

In the procedure of Example 1, a mixture consisting of 100 parts monochloronitrobenzene (of which approximately 65% is the p-, 32% the o- and 3% the m-isomer), 1 part of morpholine (0.018 mole per mole of the nitro body) and 0.004 part of platinum (in the form of the supported catalyst described in Example 1) is hydrogenated at 75±5° C. and 350 p.s.i.g. hydrogen pressure. The mixture of chloroanilines produced, recovered as described in the previous examples, is found to be substantially free of dehalogenated product (aniline). By analysis of the water layer the extent of dehalogenation is determined to be 0.44 mole percent.

*Example 5*

Example 3 is repeated on a mixture of 100 parts of p-chloronitrobenzene, 2.5 parts of morpholine (0.045 mole per mole of nitro body) and 0.004 part of Pt as platinum oxide (Adams catalyst). The extent of dehalogenation is 0.5 mole percent. p-Chloroaniline is obtained; yield=95.8%, freezing point=68.5° C., purity=99.0%.

*Example 6*

A mixture consisting of 100 parts of 2-chloro-4-nitrotoluene, 1 part of morpholine and 0.004 part of platinum (in the form of the supported catalyst described in Example 1) is hydrogenated at 90±10° C. and 350 p.s.i.g. hydrogen pressure according to the procedure of Example 1. The extent of dehalogenation is only 0.24 mole percent. Pure 2-chloro-4-aminotoluene is obtained in 91% yield on distillation under reduced pressure according to the method of U.S. Patent 2,911,340.

*Example 7*

A mixture consisting of 200 parts of m-bromonitrobenzene, 5 parts of morpholine and 0.008 part of Pt (as the supported catalyst described in Example 1) is hydrogenated according to the procedure of Example 1 at 100°±5° C. and 500 p.s.i.g. hydrogen pressure. The extent of dehalogenation is 1.57 mole percent. The m-bromoaniline product of reaction is obtained in 90% yield on distillation.

*Example 8*

This example illustrates the use of representative cycloaliphatic amines to suppress dehalogenation in the catalytic hydrogenation of p-chloronitrobenzene. Mixtures consisting of 100 parts of the nitro body, 1 part of the cycloaliphatic amine and 0.004 part of Pt as the catalyst of Example 1 are hydrogenated at 75°±5° C. and 500 p.s.i.g. hydrogen pressure. The results are expressed below in terms of mole percent dehalogenation.

| Dehalogenation suppressor: | Mole percent dehalogenation |
|---|---|
| Morpholine | 0.2 |
| N-methylmorpholine | 1.0 |
| N-ethylmorpholine | 1.3 |
| Piperazine | 1.2 |

The preceding examples may be varied within the scope of the total specification disclosure to achieve substantially the same results. Each of the specifically described cyclo aliphatic nitrogen dehalogenation suppressors may be substituted in any of the preceding examples with any one of the nitro monocarboxylic aromatic hydrocarbons described to achieve essentially the same results; the catalyst concentration, temperature and pressure may also be varied within the described limits.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for minimizing the formation of dehalogenated products during the preparation of halogen substituted aromatic amines by the catalytic hydrogenation of nitro monocarbocyclic aromatic hydrocarbons bearing 1 to 2 halogens taken from the group consisting of Cl and Br, which process comprises effecting the reduction of said nitro compounds, at temperatures of from 30 to 150° C. and hydrogen gas pressures of at least about 100 p.s.i.g., in the presence of (a) a platinum hydrogenation catalyst, in amount providing one part of Pt for every 10,000 to 100,000 parts by weight of said nitro compound, and (b) a cycloaliphatic nitrogen base having the formula

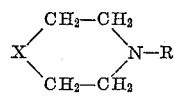

where X is a radical selected from the group consisting of oxygen and N—R, and R is selected from the group consisting of hydrogen, methyl, and ethyl radicals, the quantity of said nitrogen compound corresponding to 0.01 to 1.5 moles per mole of said nitro compound.

2. A process according to claim 1, wherein the cycloaliphatic nitrogen base is morpholine.

3. A process according to claim 1, wherein the nitro monocarbocyclic aromatic hydrocarbon is 1-nitro-3,4-dichlorobenzene.

4. A process according to claim 1, wherein the nitro monocarbocyclic aromatic hydrocarbon is 1-nitro-3,5-dichlorobenzene.

5. A process according to claim 1, wherein the nitro monocarbocyclic aromatic hydrocarbon is monochloronitrobenzene.

6. A process according to claim 1, wherein the nitro monocarbocyclic aromatic hydrocarbon is 2-chloro-4-nitrotoluene.

7. A process for minimizing the formation of dehalogenated products during the prepartaion of halogen substituted aromatic amines by the catalytic hydrogenation of nitro monocarbocyclic aromatic hydrocarbons bearing 1 to 2 halogens taken from the group consisting of Cl and Br, which process comprises effecting the reduction of said nitro compounds, at temperatures of from 50 to 120° C. and hydrogen gas pressures of from 200 to 600 p.s.i.g. in the presence of (a) a platinum hydrogenation catalyst in amount providing one part of Pt for every 25,000 to 75,000 parts by weight of said nitro compound, and (b) a cycloaliphatic nitrogen base having the formula

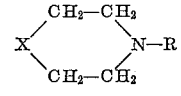

where X is a radical selected from the group consisting of oxygen and N—R, and R is selected from the group consisting of hydrogen, methyl, and ethyl radicals, the quantity of said nitrogen compound corresponding to 0.01 to 0.2 moles per mole of said nitro compound.

8. A process according to claim 7, wherein the cycloaliphatic nitrogen base is morpholine.

9. A process according to claim 7, wherein the nitro monocarbocyclic aromatic hydrocarbon is 1-nitro-3,4-dichlorobenzene.

10. A process according to claim 7, wherein the nitro monocarbocyclic aromatic hydrocarbon is 1-nitro-3,5-dichlorobenzene.

11. A process according to claim 7, wherein the nitro monocarbocyclic aromatic hydrocarbon is monochloronitrobenzene.

12. A process according to claim 7, wherein the nitro monocarbocyclic aromatic hydrocarbon is 2-chloro-4-nitrotoluene.

References Cited in the file of this patent

FOREIGN PATENTS

| | | |
|---|---|---|
| 805,249 | Great Britain | Dec. 3, 1958 |
| 859,251 | Great Britain | Jan. 18, 1961 |